United States Patent
Zhu et al.

(10) Patent No.: US 12,227,419 B2
(45) Date of Patent: Feb. 18, 2025

(54) METHOD FOR PREPARING PATTERNED GRAPHENE

(71) Applicant: SHANGHAI INSTITUTE OF MICROSYSTEM AND INFORMATION TECHNOLOGY, CHINESE ACADEMY OF SCIENCES, Shanghai (CN)

(72) Inventors: Hongyan Zhu, Shanghai (CN); Tianru Wu, Shanghai (CN); Jiebin Gu, Shanghai (CN); Chao Zhang, Shanghai (CN); Boxiang Gao, Shanghai (CN)

(73) Assignee: SHANGHAI INSTITUTE OF MICROSYSTEM AND INFORMATION TECHNOLOGY, CHINESE ACADEMY OF SCIENCES, Shanghai (CN)

( * ) Notice: Subject to any disclaimer, the term of this patent is extended or adjusted under 35 U.S.C. 154(b) by 739 days.

(21) Appl. No.: 17/477,573

(22) Filed: Sep. 17, 2021

(65) Prior Publication Data
US 2022/0396485 A1    Dec. 15, 2022

(30) Foreign Application Priority Data

Jun. 10, 2021    (CN) .......................... 202110645459.7

(51) Int. Cl.
*C01B 32/186* (2017.01)

(52) U.S. Cl.
CPC ........ *C01B 32/186* (2017.08); *C01B 2204/22* (2013.01); *C01P 2006/40* (2013.01)

(58) Field of Classification Search
CPC . C01B 32/184; C01B 32/186; C01B 2204/22; C01P 2006/40
See application file for complete search history.

(56) References Cited

U.S. PATENT DOCUMENTS

| | | | |
|---|---|---|---|
| 9,845,551 B2 * | 12/2017 | Tour ........................ | C30B 25/02 |
| 2013/0160701 A1 * | 6/2013 | Arnold .............. | H01L 21/02527 |
| | | | 977/843 |
| 2022/0371900 A1 * | 11/2022 | Ciochon ............... | C01B 32/956 |

* cited by examiner

*Primary Examiner* — Richard M Rump
(74) *Attorney, Agent, or Firm* — IPRTOP LLC

(57) ABSTRACT

The present disclosure provides a method for preparing patterned graphene, and the method includes using a silicon carbide base as a solid-state carbon source, decomposing the silicon carbide under the action of high temperature and catalyst, to directly grow graphene on an insulating substrate. Through a first patterned trench and a second patterned trench in an accommodating passage, the pattern of the formed graphene can be directly controlled. Therefore, the present disclosure can accurately locate the position of the patterned graphene on the insulating substrate, it does not require transferring the graphene one more time, thereby avoiding contaminating the graphene and damaging its structure, and there is no need for photo-lithography, ion etching and other processes to treat the graphene in order to obtain patterned graphene, which further avoids damages to the graphene.

10 Claims, 5 Drawing Sheets providing a silicon carbide base, which includes a first side and a second side opposite to the first side;

↓ forming an accommodating passage in the silicon carbide base, and the accommodating passage includes a first patterned trench on the first side of the silicon carbide base, a second patterned trench on the second side of the silicon carbide base, and a connection through hole penetrating the silicon carbide base and connected with the first patterned trench and second patterned trench

↓ providing a catalyst and an insulating substrate, and placing the catalyst in the accommodating passage, with the insulating substrate in contact with the two opposite sides of the silicon carbide base to form a sandwich structure

↓ placing the sandwich structure in a heating device and carrying out a catalytic reaction, so that the silicon carbide base is decomposed under the action of the catalyst, thereby obtaining patterned graphene on the insulating substrate providing a silicon carbide base, which includes a first side and a second side opposite to the first side;

↓ forming an accommodating passage in the silicon carbide base, and the accommodating passage includes a first patterned trench on the first side of the silicon carbide base, a second patterned trench on the second side of the silicon carbide base, and a connection through hole penetrating the silicon carbide base and connected with the first patterned trench and second patterned trench

↓ providing a catalyst and an insulating substrate, and placing the catalyst in the accommodating passage, with the insulating substrate in contact with the two opposite sides of the silicon carbide base to form a sandwich structure

↓ placing the sandwich structure in a heating device and carrying out a catalytic reaction, so that the silicon carbide base is decomposed under the action of the catalyst, thereby obtaining patterned graphene on the insulating substrate

Fig. 1

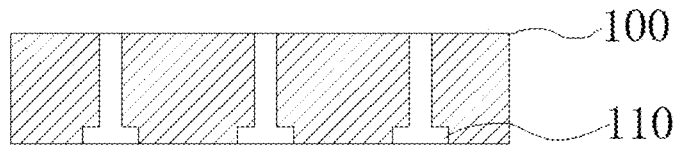

Fig. 2

METHOD FOR PREPARING PATTERNED GRAPHENE

CROSS REFERENCE TO RELATED APPLICATION

The present application claims the benefit of priority to Chinese Patent Application No. CN 2021106454597, entitled "METHOD FOR PREPARING PATTERNED GRAPHENE", filed with CNIPA on Jun. 10, 2021, the disclosure of which is incorporated herein by reference in its entirety for all purposes.

FIELD OF TECHNOLOGY

The present disclosure generally relates to graphene devices, in particular, to a method for preparing patterned graphene.

BACKGROUND

Graphene is a two-dimensional mono-atomic layered material, with the atoms arranged in a honeycomb grid. Since Geim and Novoselov successfully isolated a single layer of graphene by mechanical stripping in 2004, related exploration has expanded the horizons of two-dimensional materials research. The unique two-dimensional structure of graphene offers it many unique physical and chemical properties, such as high carrier mobility at room temperature, ballistic transport properties of the sub-micron scale, significant visible light transmittance, special thermal conductivity, and excellent mechanical properties such as high Young's modulus, which makes it promising for applications in micro- and nano-electronics, optical devices, etc.

Graphene usually needs to be patterned for the fabrication of graphene-based micro- and nano-electronic devices. At present, commonly used patterning techniques include: 1) transferring graphene with a large area to an insulating substrate, and then obtaining patterned graphene through photo-lithography and ion etching (this method ensures high precision, but inevitably contaminates and damages the graphene); 2) directly growing patterned graphene and then transferring the patterned graphene to an insulating substrate (this method does not require a photo-lithography process, but it cannot accurately position the graphene on the substrate, and contamination and wrinkles will be introduced during the transfer process); 3) the template imprinting method, where graphene is imprinted where needed (this method is simple and convenient, but the template preparation is costly, and the method is unable to obtain complex patterns).

Therefore, it is necessary to provide a method for preparing patterned graphene.

SUMMARY

The present disclosure provides a method for preparing patterned graphene, including: providing a silicon carbide base, which includes a first side and a second side opposite to the first side; forming an accommodating passage in the silicon carbide base, wherein the accommodating passage includes a first patterned trench on the first side of the silicon carbide base, a second patterned trench on the second side of the silicon carbide base, and a connection through hole penetrating the silicon carbide base and connected with the first patterned trench and second patterned trench; providing a catalyst and an insulating substrate, and placing the catalyst in the accommodating passage, wherein the insulating substrate is in contact with the two opposite sides of the silicon carbide base to form a sandwich structure; and placing the sandwich structure in a heating device and carrying out a catalytic reaction, so that the silicon carbide base is decomposed under the action of the catalyst, thereby obtaining patterned graphene on the insulating substrate.

In one embodiment, the silicon carbide base is one of a 4H-SiC (that is, silicon carbide with a hexagonal crystal structure denoted by 4H) base or 6H-SiC (that is, silicon carbide with a hexagonal crystal structure denoted by 6H) base, and the silicon carbide (SiC) includes intrinsic SiC or doped SiC.

In one embodiment, the shape of the first patterned trench includes one or more of a circular dot array, lines, disks, rectangles, and coils; the shape of the second patterned trench includes one or more of a circular dot array, lines, disks, rectangles, and coils.

In one embodiment, dimensions of the first patterned trench and the second patterned trench are in the micron level.

In one embodiment, the catalyst includes a single metal element, which includes gallium, germanium, bismuth, indium, or tin; the catalyst includes an alloy, which includes one or more of gallium-palladium, gallium-nickel, gallium-indium, gallium-nickel, copper-cobalt, and nickel-molybdenum.

In one embodiment, the insulating substrate includes one of a silicon substrate, a silicon oxide substrate, a $SiO_2/Si$ substrate, a silicon carbide substrate, and a sapphire substrate.

In one embodiment, conditions of the catalytic reaction include a temperature of from 800° C. to 1300° C., a holding time of from 10 min to 60 min, and an air pressure of from 10 Pa to 10000 Pa; the carrier gas of the catalytic reaction includes mixed gas composed of hydrogen with a flow rate of 1-50 sccm (standard cubic centimeters per minute) and argon with a flow rate of 100-300 sccm.

In one embodiment, the heating device includes a cold-wall chemical vapor deposition (CVD) component or a hotwall CVD component.

In one embodiment, the method further includes removing the catalyst on surfaces of the graphene by a corrosive agent, including using hydrochloric acid with a concentration of 5% to 20% as the corrosive agent, and heating at a constant temperature of 50° C. to 80° C. for 0.5 h to 3 h.

In one embodiment, the patterned graphene is applied to devices including microelectronic devices.

In summary, in the method for preparing patterned graphene of the present disclosure, an accommodating passage is formed in a silicon carbide base, and the accommodating passage includes a first patterned trench on a first side of the silicon carbide base, a second patterned trench on the second side of the silicon carbide base, and a connection through hole penetrating the silicon carbide base and connecting with the first patterned trench and second patterned trench, such that the catalyst can be placed in the accommodating passage. An insulating substrate is in contact with the two opposite sides of the silicon carbide base to form a sandwich structure. A catalytic reaction can be carried out in a heating device to obtain patterned graphene on the insulating substrate. The present disclosure has the following beneficial effects:

(1) When the silicon carbide base is directly in contact with the insulating substrate, the patterned graphene can be accurately positioned on the insulating substrate;

(2) Patterned graphene is directly formed on the insulating substrate, so it does not need to be transferred again, which avoids contaminating the graphene and damaging its structure.

(3) Patterns of the graphene pattern can be directly controlled by controlling the shape of the first and second patterned trenches on the upper and lower sides of the silicon carbide base, and there is no need to process the graphene by photo-lithography, ion etching or other processes, thereby avoiding damaging the graphene.

(4) Because there is no need to transfer the graphene, the method avoids the problem that the graphene with a large size and complex patterns is easily damaged during the transfer process, so it is possible to prepare high-quality graphene with a large size and complex patterns.

BRIEF DESCRIPTION OF THE DRAWINGS

FIG. 1 is a schematic diagram showing a preparation process flow of patterned graphene in an embodiment of the present disclosure.

FIG. 2 is a schematic structural diagram showing a cross-section of an intermediate structure obtained after forming an accommodating passage in a silicon carbide base in an embodiment of the present disclosure.

REFERENCE NUMERALS

Figure 3:
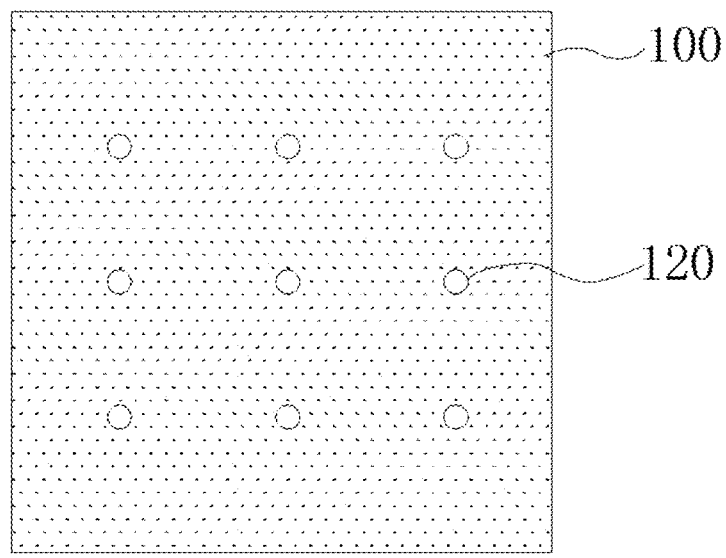
FIG. 3 is a schematic structural diagram of a first patterned trench in an embodiment of the present disclosure.
Figure 4:
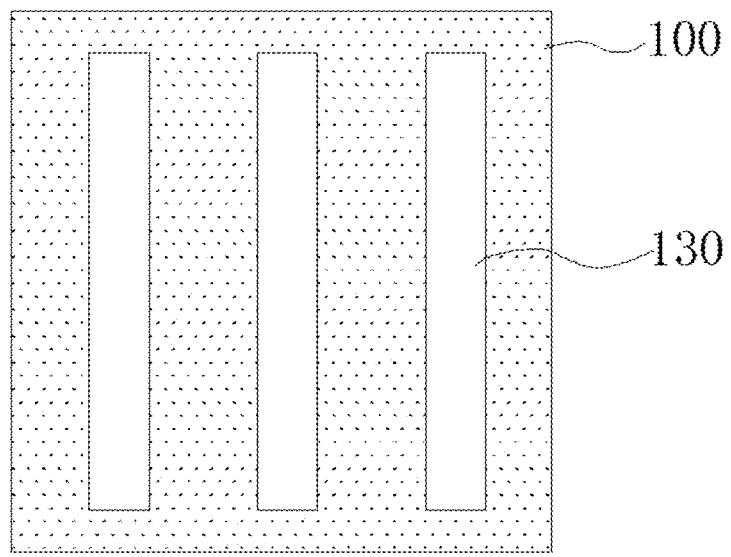
FIG. 4 is a schematic structural diagram of a second patterned trench in an embodiment of the present disclosure.

100 Silicon carbide base
110 Connection through hole
120 Circular trench
130 Rectangular trench
140 Liquid catalyst
150 First insulating substrate
160 Second insulating substrate
170 Circular graphene
180 Rectangular graphene

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure.

Please refer to FIG. 1~FIG. 11. It should be noted that the drawings provided in this disclosure only illustrate the basic concept of the present disclosure in a schematic way, so the drawings only show the components related to the present disclosure. The drawings are not necessarily drawn according to the number, shape and size of the components in actual implementation; during the actual implementation, the type, quantity and proportion of each component can be changed as needed, and the components' layout may also be more complicated.

Please refer to FIG. 1. The present disclosure provides a method for preparing patterned graphene, including the following steps:

S1: providing a silicon carbide base, which includes a first side and a second side opposite to the first side;

S2: forming an accommodating passage in the silicon carbide base, wherein the accommodating passage includes a first patterned trench on the first side of the silicon carbide base, a second patterned trench on the second side of the silicon carbide base, and a connection through hole penetrating the silicon carbide base and connecting with the first patterned trench and second patterned trench;

S3: providing catalyst and an insulating substrate, and placing the catalyst in the accommodating passage, the insulating substrate is in contact with the two opposite sides of the silicon carbide base to form a sandwich structure;

S4: placing the sandwich structure in a heating device and carrying out a catalytic reaction, so that the silicon carbide base is decomposed under the action of the catalyst, thereby obtaining patterned graphene on the insulating substrate.

Specifically, during the preparation of the patterned graphene, the silicon carbide base serves as a solid-state carbon source, and the silicon carbide can be decomposed under the action of high temperature and catalyst, so that the graphene can be directly grown on the insulating substrate. Through the first patterned trench and second patterned trench in the accommodating passage, the pattern of the formed graphene can be directly controlled. Therefore, the present disclosure can accurately locate the position of the patterned graphene on the insulating substrate, it does not require transferring the graphene one more time, thereby avoiding contaminating the graphene and damaging its structure, and there is no need for photo-lithography, ion etching and other processes to treat the graphene in order to obtain patterned graphene, which further avoids damages to the graphene. Thus, graphene with complex patterns, large size and high quality can be manufactured, and problems that graphene with large size and complex pattern is easily damaged during the transfer process can be solved. As an example, the silicon carbide base may include a 4H-SiC base or a 6H-SiC base. The silicon carbide base may be an intrinsic silicon carbide base or a highly doped silicon carbide base, and the type and size of the silicon carbide base may be adjusted as needed.

As an example, the shape of the first patterned trench includes one or more of a circular dot array, lines, disks, rectangles, and coils; the shape of the second patterned trench includes one or more of a circular dot array, lines, disks, rectangles, and coils. The shape of the first patterned trench can be the same as that of the second patterned trench. Further, dimensions of the first patterned trench and the second patterned trench are in the micrometer scale, in order to form micrometer-scale graphene. The specific shape and layout of the first patterned trench and second patterned trench can be set according to the pattern of the patterned graphene, to finally obtain the patterned graphene corresponding to the patterned trenches.

As an example, the catalyst may include a single metal element, which may include a low-melting-point metal such as gallium, germanium, bismuth, indium, or tin. The catalyst may include an alloy, which includes a low-melting-point alloy such as gallium-palladium, gallium-nickel, gallium-indium, gallium-nickel, copper-cobalt, or nickel-molybdenum.

Specifically, the catalyst may be a single metal catalyst, a binary metal catalyst, or an alloy catalyst. The catalyst described in S3 is heated to a liquid state when injected into the accommodating passage.

As an example, depending on actual needs, the insulating substrate may include one of a silicon substrate, a silicon oxide substrate, a SiO2/Si substrate, a silicon carbide substrate, or a sapphire substrate.

As an example, conditions of the catalytic reaction may include a temperature of 800° C. to 1300° C., such as 800° C., 1000° C., 1200° C., etc., a holding time of 10 min to 60 min, such as 10 min, 30 min, 50 min, etc., and air pressure of 10 Pa~10000 Pa, such as 10 Pa, 5000 Pa, 8000 Pa, etc. Carrier gas of the catalytic reaction can be a mixture of hydrogen with a flow of 1 sccm~50 sccm and argon with a flow of 100 sccm~300 sccm. For example, the flow rate of hydrogen is 1 sccm, 15 sccm, or 40 sccm, and the flow rate of argon is 100 sccm, 150 sccm, or 200 sccm.

As an example, the heating device may include a cold-wall CVD or a hot-wall CVD to provide process conditions required by catalytic reactions, but the type of the heating device is not limited thereto.

As an example, after step S4, the method further includes step S5 which processes the patterned graphene, and S5 may include: removing the catalyst from surfaces of the graphene using a corrosive agent, including using hydrochloric acid with a concentration of 5% to 20% (for example, 5%, 10%, 15%, 20%, and the like) as the corrosive agent, and heating at a constant temperature of 50-80° C. (for example, 50° C., 60, 70° C., 80° C., and the like) for 0.5-3 h (for example, 0.5 h, 1 h, 2 h, 3 h, and the like), to remove the catalyst remaining on the surfaces of the patterned graphene, in order to obtain clean, high-quality patterned graphene, thereby facilitating subsequent processes.

As an example, the patterned graphene prepared above can be applied to photoelectric devices, but the application of the patterned graphene is not limited thereto.

The present disclosure will be described in detail below with reference to specific embodiments.

Embodiment 1: Using liquid metal Ga/Pd as a catalyst to prepare patterned graphene on an insulating substrate First, referring to FIG. 2-FIG. 4, S1 and S2 are performed, which include: providing a silicon carbide base 100, forming an accommodating passage in the silicon carbide base 100, wherein the accommodating passage includes a first patterned trench on the first side of the silicon carbide base, a second patterned trench on the second side of the silicon carbide base, and a connection through hole 110 penetrating the silicon carbide base 100 and connecting with the first patterned trench and second patterned trench.

In this embodiment, the silicon carbide base 100 uses 4H-SiC, which is inexpensive, and relatively common. The first patterned trench is a circular trench 120, and the second patterned trench is a rectangular trench 130.

Figure 5:
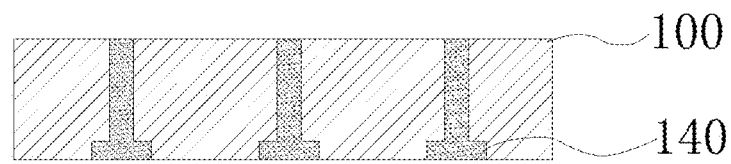
FIG. 5 is a schematic structural diagram of an intermediate structure obtained after injecting a catalyst into an accommodating passage in an embodiment of the present disclosure.
Figure 6:
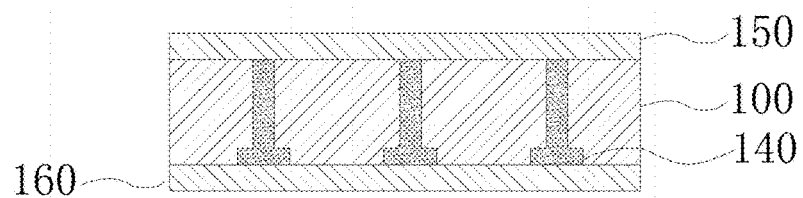
FIG. 6 shows a schematic structural diagram of forming a sandwich structure in an embodiment of the present disclosure.

Next, referring to FIGS. 5 and 6, step S3 is performed to provide a liquid catalyst 140, a first insulating substrate 150 and a second insulating substrate 160, and place the liquid catalyst 140 in the accommodating passage. The first insulating substrate 150 and the second insulating substrate 160 are closely combined with the first side and the second side of the silicon carbide base 100, respectively, to form a sandwich structure, as shown in FIG. 6.

In this embodiment, 95% Ga/5% Pd is used as the liquid catalyst 140, and SiO2/Si is used as the material of the first insulating substrate 150 and the second insulating substrate 160.

Next, proceed to step S4, which includes placing the sandwich structure in a heating device to perform a catalytic reaction.

Specifically, in this embodiment, the sandwich structure is first placed in a tube furnace, then the temperature of the furnace is raised to 1000° C., argon (195 sccm) and hydrogen (5 sccm) are used as carrier gases, the reaction time is 30 minutes, and the working pressure is between 120 Pa and 150 Pa, so that the silicon carbide base 100 is decomposed under the action of the high temperature and the liquid catalyst 140. Then, circular graphene 170 is formed at the interface between the liquid catalyst 140 and the first insulating substrate 150, and rectangular graphene 180 is formed at the interface between the liquid catalyst 140 and the second insulating substrate 160. Then, the tube furnace is no longer heated, and the sample is taken out after the temperature of the tube furnace's chamber drops to room temperature.

Figure 7:
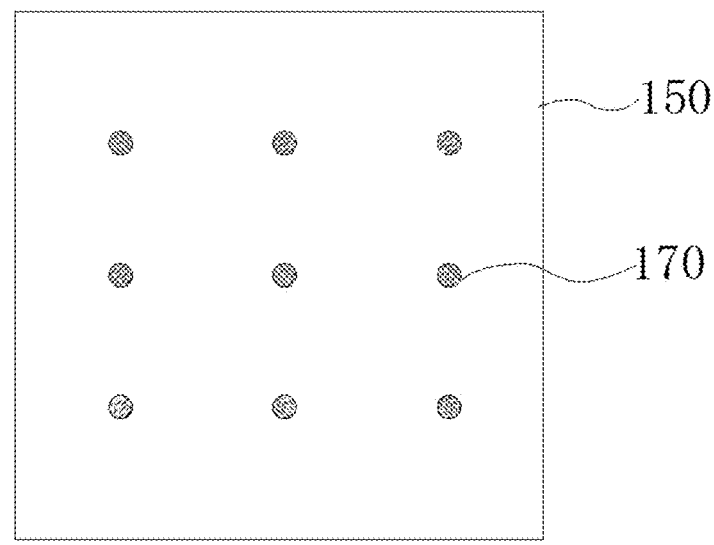
FIG. 7 shows a schematic structural diagram of graphene patterned with a circular dot arrayin an embodiment of the present disclosure.
Figure 8:
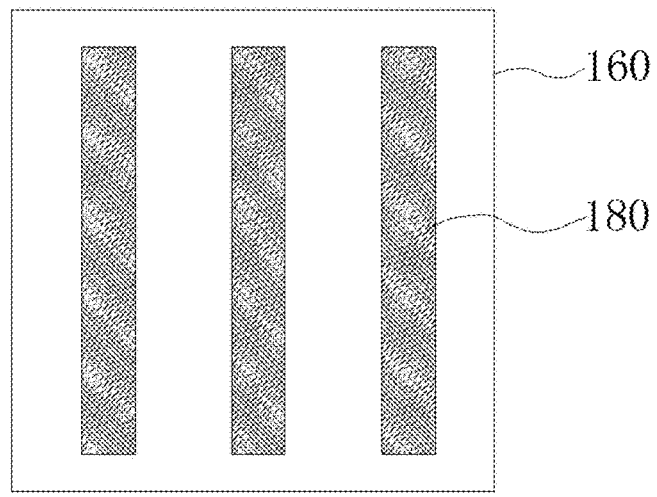
FIG. 8 shows a schematic structural diagram of graphene patterned with rectanglesin an embodiment of the present disclosure.

Finally, referring to FIGS. 7 and 8, proceed to step S5, which includes using a corrosive agent to remove the metal catalyst on the surfaces of the graphene. Specifically, the sample may be immersed in 18% hydrochloric acid and heated at a constant temperature of 80° C. for 1 hour to remove alloy droplets on the surfaces in order to obtain the patterned circular graphene 170 and rectangular graphene 180.

Figure 9:
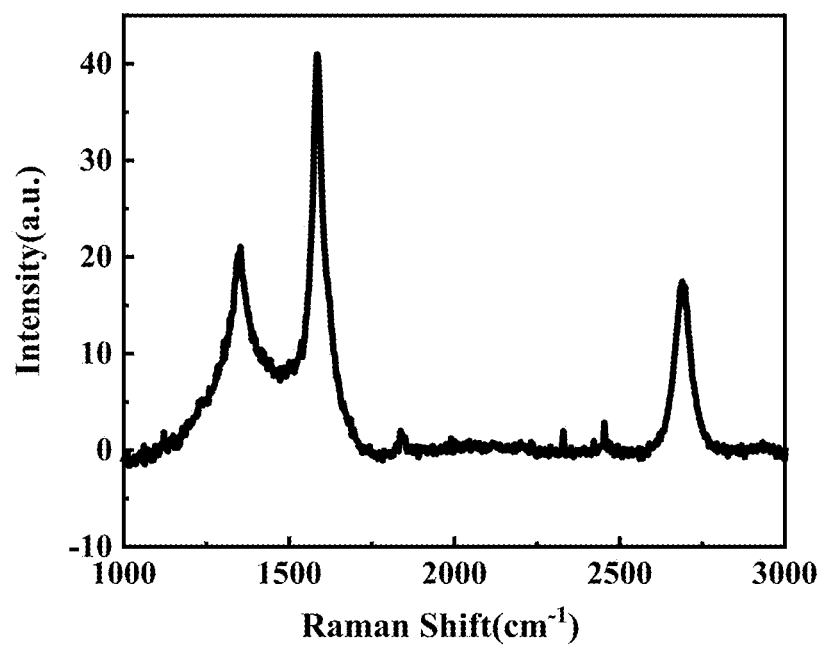
FIG. 9 shows the Raman spectrum of patterned graphene in an embodiment of the present disclosure.
Figure 10:
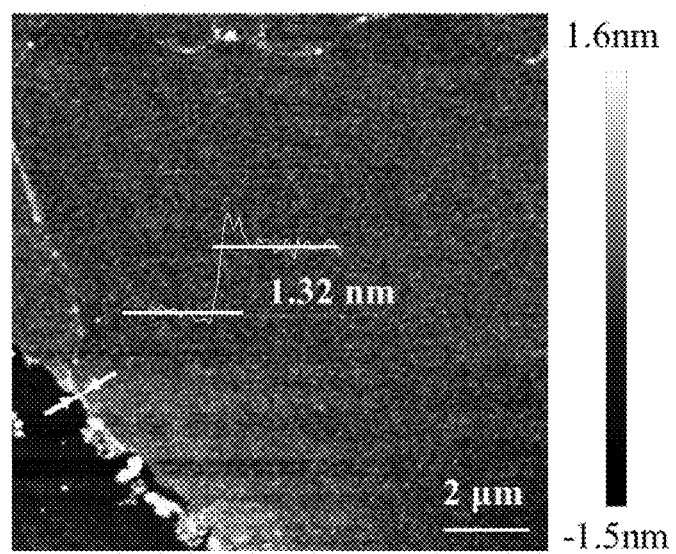
FIG. 10 shows a height AFM image of patterned graphene in an embodiment of the present disclosure.

FIG. 9 is the Raman spectrum of the patterned graphene obtained in this embodiment. The Raman test shows that the graphene has good crystallinity. The 2D peak is at around 2700 cm-1, whose intensity is about 0.65 times that of the G peak, indicating that the graphene is multi-layered. FIG. 10 is a diagram showing a height AFM image of patterned graphene obtained in the present embodiment, illustrating that the thickness of graphene is 1.32 nm, and that the graphene contains about 3 layers.

Embodiment 2: Using liquid metal Ga/Ni as a catalyst to prepare patterned graphene on an insulating substrate The difference between this embodiment and the first embodiment is that the liquid alloy catalyst 95% Ga/5% Pd in the first embodiment is replaced with 90% Ga/10% Ni. Parameters of the remaining process are the same. The test shows that in this embodiment, patterned graphene can also be obtained on the surface of the insulating substrate. Please refer to Embodiment 1 for other detailed steps.

Embodiment 3: Using liquid metal Ga/In as a catalyst to prepare patterned graphene on an insulating substrate The difference between this embodiment and the first embodiment is that the liquid alloy catalyst Ga/Pd alloy in the first embodiment is replaced with a Ga/In alloy. Parameters for the remaining process are the same as those of the first embodiment. The test proves that this embodiment can also be used to obtain corresponding patterned graphene on the surface of the insulating substrate. Please refer to Embodiment 1 for other detailed steps.

Figure 11:
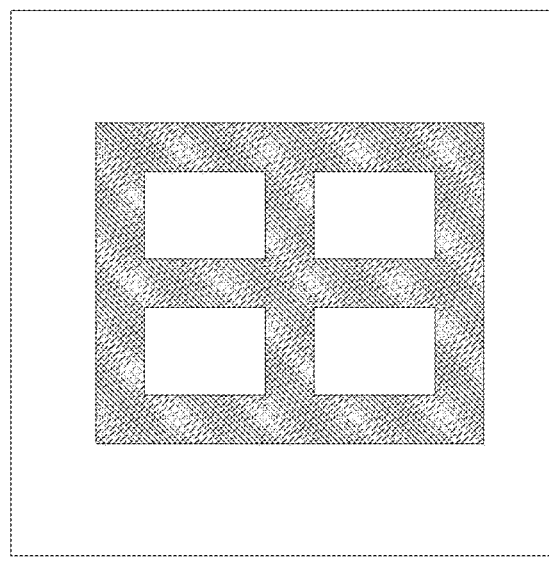
FIG. 11 shows a schematic structural diagram of patterned graphene with another pattern prepared in an embodiment of the present disclosure.

Embodiment 4: Using liquid metal Ga/Pd as a catalyst to prepare patterned graphene on an insulating substrate The difference between this embodiment and the first embodiment is that the second patterned trench described in the first embodiment is changed to have a square/cross structure, i.e., a "⊞" shaped structure as illustrated in FIG. 11, which includes a cross and a square, with the cross being within the square and connected to the square, and it has dimensions down to the micrometer scale. Parameters of the remaining processes are the same as those of the first embodiment. The test proves that this embodiment is able to obtain the patterned graphene having a square/cross structure corresponding to the second patterned trench, as shown in FIG. 11.

In summary, in the method for preparing patterned graphene of the present disclosure, an accommodating passage is formed in a silicon carbide base, wherein the accommodating passage includes a first patterned trench on a first side of the silicon carbide base, a second patterned trench on a second side of the silicon carbide base, and a connection through hole penetrating the silicon carbide base and connecting with the first patterned trench and second patterned trench; catalyst is placed in the accommodating passage; an insulating substrate is in contact with the two opposite sides of the silicon carbide base to form a sandwich structure; and a catalytic reaction can be carried out in a heating device to obtain patterned graphene on the insulating substrate. In the present disclosure, (1) the way the silicon carbide base is directly in contact with the insulating substrate ensures that the patterned graphene can be accurately positioned on the insulating substrate; (2) patterned graphene is directly formed on the insulating substrate, so it does not need to be transferred again, which avoids contaminating the graphene and damaging its structure; (3) patterns of the graphene pattern can be directly controlled by controlling the shape of the first and second patterned trenches on the upper and lower sides of the silicon carbide base, and there is no need to process the graphene by photo-lithography, ion etching and other processes, thereby further avoiding damaging the graphene; (4) because there is no need to transfer the graphene, the method avoids the problem that the graphene with a large size and complex patterns is easily damaged during the transfer process, so it is possible to prepare high-quality graphene with a large size and complex patterns. Therefore, the present disclosure effectively overcomes various shortcomings of the prior art and has a high industrial value.

The above-mentioned embodiments only exemplarily illustrate the principles and effects of the present disclosure, but are not used to limit the present disclosure. Anyone familiar with this technology can modify or change the above-mentioned embodiments without departing from the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. A method for preparing patterned graphene, comprising:
providing a silicon carbide base, which comprises a first side and a second side opposite to the first side;
forming an accommodating passage in the silicon carbide base, wherein the accommodating passage comprises a first patterned trench on the first side of the silicon carbide base, a second patterned trench on the second side of the silicon carbide base, and a connection through hole penetrating the silicon carbide base and connected with the first patterned trench and second patterned trench;
providing a catalyst and an insulating substrate, and placing the catalyst in the accommodating passage, wherein the insulating substrate is in contact with the two opposite sides of the silicon carbide base to form a sandwich structure; and
placing the sandwich structure in a heating device and carrying out a catalytic reaction, so that the silicon carbide base is decomposed under the action of the catalyst, thereby obtaining patterned graphene on the insulating substrate.

2. The method for preparing patterned graphene according to claim 1, wherein the silicon carbide base is one of a 4H-SiC base and a 6H-SiC base, wherein the SiC is intrinsic SiC or doped SiC.

3. The method for preparing patterned graphene according to claim 1, wherein the shape of the first patterned trench includes one or more of a circular dot array, lines, disks, rectangles, and coils; the shape of the second patterned trench includes one or more of a circular dot array, lines, disks, rectangles, and coils.

4. The method for preparing patterned graphene according to claim 1, wherein dimensions of the first patterned trench and the second patterned trench are in the micrometer scale.

5. The method for preparing patterned graphene according to claim 1, wherein the catalyst comprises a single metal element or an alloy of metals, wherein the single metal element comprises gallium, germanium, bismuth, indium, or tin, wherein the alloy of metals comprises one or more of gallium-palladium, gallium-nickel, gallium-indium, copper-cobalt, and nickel-molybdenum.

6. The method for preparing patterned graphene according to claim 1, wherein the insulating substrate comprises one of a silicon substrate, a silicon oxide substrate, a $SiO_2$/Si substrate, a silicon carbide substrate, and a sapphire substrate.

7. The method for preparing patterned graphene according to claim 1, wherein conditions of the catalytic reaction include a temperature of from 800° C. to 1300° C., a holding time of from 10 min to 60 min, and an air pressure of from 10 Pa to 10000 Pa, wherein carrier gas of the catalytic reaction comprises mixed gas, and the mixed gas comprises hydrogen with a flow rate of from 1 sccm to 50 sccm and argon with a flow rate of from 100 sccm to 300 sccm.

8. The method for preparing patterned graphene according to claim 1, wherein the heating device comprises a cold-wall CVD or a hot-wall CVD.

9. The method for preparing patterned graphene according to claim 1, further comprising: removing the catalyst on surfaces of the graphene by a corrosive agent, including using hydrochloric acid with a concentration of 5% to 20% as the corrosive agent, and heating at a constant temperature of 50° C. to 80° C. for 0.5 h to 3 h.

10. The method for preparing patterned graphene according to claim 1, wherein the patterned graphene is applied to devices including microelectronic devices.

* * * * *